United States Patent
Weiss et al.

(10) Patent No.: US 9,764,858 B2
(45) Date of Patent: Sep. 19, 2017

(54) MODEL PREDICTIVE CONTROL OF SPACECRAFT

(71) Applicant: Mitsubishi Electric Research Laboratories, Inc., Cambridge, MA (US)

(72) Inventors: Avishai Weiss, Cambridge, MA (US); Stefano Di Cairano, Somerville, MA (US); Uros Kalabic, Ypsilanti, MI (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 259 days.

(21) Appl. No.: 14/591,298

(22) Filed: Jan. 7, 2015

(65) Prior Publication Data
US 2016/0194095 A1  Jul. 7, 2016

(51) Int. Cl.
 *B64G 1/24* (2006.01)
 *G05D 1/10* (2006.01)
 *G05D 1/08* (2006.01)

(52) U.S. Cl.
CPC ........... *B64G 1/242* (2013.01); *G05D 1/0883* (2013.01); *G05D 1/10* (2013.01); *B64G 2001/245* (2013.01)

(58) Field of Classification Search
CPC .......... B64G 1/365; B64G 1/24; B64G 1/242; B64G 1/26; B64G 1/28; B64G 1/281; B64G 1/283; B64G 1/286; B64G 2001/245; B64G 2001/247; G05D 1/0883; G05D 1/10
USPC .......................................................... 701/13
See application file for complete search history.

(56) References Cited

U.S. PATENT DOCUMENTS

| | | | | |
|---|---|---|---|---|
| 3,866,025 A * | 2/1975 | Cavanagh | ................ | B64G 1/26 244/169 |
| 4,732,354 A * | 3/1988 | Lievre | ...................... | B64G 1/28 244/168 |
| 4,767,084 A | 8/1988 | Chan et al. | | |
| 5,349,532 A | 9/1994 | Tilley et al. | | |
| 5,452,869 A * | 9/1995 | Basuthakur | ............. | B64G 1/24 244/164 |
| 5,984,236 A * | 11/1999 | Keitel | ...................... | B64G 1/24 244/164 |
| 6,015,116 A | 1/2000 | Anzel et al. | | |
| 6,042,058 A | 3/2000 | Anzel | | |

(Continued)

OTHER PUBLICATIONS

Fisher et al., "Spacecraft Momentum Management and Attitude Control using a Receding Horizon Approach", Aug. 2007.*

*Primary Examiner* — Courtney Heinle
*Assistant Examiner* — Angelina Shudy
(74) *Attorney, Agent, or Firm* — Gene Vinokur; James McAleenan; Hironori Tsukamoto

(57) ABSTRACT

A method controls an operation of a spacecraft according to a model of the spacecraft. The method determines control inputs for controlling concurrently thrusters of the spacecraft and momentum exchange devices of the spacecraft using an optimization of a cost function over a receding horizon subject to constraints on a pose of the spacecraft and constraints on inputs to the thrusters. The cost function includes components for controlling the pose of the spacecraft and a momentum stored by the momentum exchange devices. The method generates a command to control concurrently the thrusters and the momentum exchange devices according to at least a portion of the control inputs.

16 Claims, 9 Drawing Sheets

(56) References Cited

U.S. PATENT DOCUMENTS

| | | | |
|---|---|---|---|
| 6,208,915 B1* | 3/2001 | Schutte | B64G 1/26 244/164 |
| 6,296,207 B1 | 10/2001 | Tilley et al. | |
| 6,435,457 B1 | 8/2002 | Anzel | |
| 6,439,507 B1 | 8/2002 | Reckdahl et al. | |
| 7,918,420 B2* | 4/2011 | Ho | B64G 1/26 244/158.8 |
| 8,282,043 B2 | 10/2012 | Ho | |
| 8,352,101 B2 | 1/2013 | Thomas et al. | |
| 2005/0080522 A1* | 4/2005 | Hamamatsu | G05D 1/0206 701/21 |
| 2008/0315039 A1* | 12/2008 | Rudd | B64G 1/24 244/164 |
| 2009/0218449 A1* | 9/2009 | Kamiya | B64G 1/24 244/165 |
| 2010/0193641 A1* | 8/2010 | Liu | G05D 1/0883 244/165 |
| 2013/0325306 A1* | 12/2013 | Caveney | B60W 30/0953 701/117 |
| 2014/0138491 A1 | 5/2014 | Woo et al. | |

* cited by examiner

MODEL PREDICTIVE CONTROL OF SPACECRAFT

FIELD OF THE INVENTION

This invention relates generally to controlling an operation of a spacecraft, and more particularly to controlling the operation using a model predictive control (MPC) over a receding horizon.

BACKGROUND OF THE INVENTION

A spacecraft in orbit is subject to various disturbance forces that affect its ability to maintain its station, i.e., desired orbit and position on the desired orbit. To counteract these forces, spacecraft are generally equipped with thrusters for station keeping maneuvers. Existing approaches to handle station keeping requirements use impulsive propulsion systems that are manually commanded from a ground control center.

In addition to orbital perturbations, spacecraft are disturbed by external torques that are generally absorbed by onboard momentum exchange devices, such as reaction wheels or control moment gyroscopes, allowing the spacecraft to maintain a desired orientation relative to the Earth or stars. To prevent saturation of the momentum exchange device and subsequent loss of the desired spacecraft attitude, the stored angular momentum is periodically unloaded via the onboard thrusters, which is also a manually commanded process from a ground control center.

The process of determining and commanding the onboard thrusters from a ground control center is manual, tedious and does not easily scale to the increasing number of spacecraft in particular orbits, e.g. geostationary orbit, and their tight station keeping windows as required, for example, for spacecraft co-location. Also, such a manual control results in an open-loop strategy, which is not able to automatically correct for errors introduced in the modeling or implementation of the desired station keeping and momentum management maneuvers, thus resulting in limited precision positioning and pointing of the spacecraft.

Generally station keeping and momentum unloading are achieved by a different set of thrusters, which is undesirable due to mass being a driving consideration in spacecraft design, and due to the increase in complexity and cost. Combined station keeping and momentum unloading problem using the same set of thrusters results in multiple objectives, and methods for coordinating such objectives in order to achieve them concurrently are challenging, see, e.g., method described in U.S. Pat. No. 8,282,043 that simplify the control by using maximum values available for torques and forces of the thrusters.

SUMMARY OF THE INVENTION

It is an object of some embodiments of an invention to provide a system and a method for concurrent control of an orbital position and accumulated onboard momentum of a spacecraft using a single set of thrusters. It is another object of some embodiment to provide such a method that achieves the concurrent control using a model predictive control (MPC) over a receding horizon. It is further object of some embodiments to avoid control manually commanded from the ground and to provide an autonomous control that can be implemented in an onboard control system resulting in tighter and more accurate station keeping and momentum unloading.

Some embodiments of the invention are based on the realization that it is possible to use a single set of thrusters for concurrent station keeping and momentum unloading maneuvers by coordinating the requested thrust for both maneuvers amongst the available thrusters while respecting total thrust limitations. For example, the requirements of the station keeping and momentum management, such as a tight permissible station keeping window, stringent constraints on available thrust, and coordination required between orbital control for the station keeping and attitude control for the momentum unloading, impose constraints on the states and inputs that the controller must satisfy.

It is an additional realization that a model predictive control (MPC) with a specifically defined model, a cost function, and constraints can be advantageous for generating fuel efficient maneuvers, which increases the effective life of the spacecraft. For example, the cost function of the MPC can include dual objectives for concurrent control of an orbital position and accumulated onboard momentum of a spacecraft using a single set of thrusters. Furthermore, the optimization of that cost function can be subject to the constraints on the states and the inputs for coordinated orbital and attitude control.

In addition, the MPC is an autonomous closed-loop control that can be implemented in an onboard control system. Some embodiments can optionally further reduce the computational complexity of the MPC by formulating the MPC as a quadratic program (QP) which utilizes a prediction model of the spacecraft based on linearized orbital and linearized attitude dynamic equations around the spacecraft's nominal operating condition.

Also, one embodiment controlling the spacecraft on the geostationary Earth orbit (GEO) takes advantage of the orbital plane coupling of the linearized orbital (CWH) equations to achieve fuel efficient maneuvers. This embodiment includes a disturbance prediction model with the analytic expressions for the relevant non-Keplerian disturbance forces in the MPC prediction model.

Accordingly, one embodiment of the invention discloses a method for controlling an operation of a spacecraft according to a model of the spacecraft. The method includes determining control inputs for controlling concurrently thrusters of the spacecraft and momentum exchange devices of the spacecraft using an optimization of a cost function over a receding horizon subject to constraints on a pose of the spacecraft and constraints on inputs to the thrusters, wherein the cost function includes components for controlling the pose of the spacecraft and a momentum stored by the momentum exchange devices; and generating a command to control concurrently the thrusters and the momentum exchange devices according to at least a portion of the control inputs. The steps of the method are performed by a processor of the spacecraft.

Another embodiment discloses a control system for controlling an operation of a spacecraft according to a model of the spacecraft, comprising at least one processor for executing modules of the control system. The modules includes a control input module for determining control inputs for controlling concurrently thrusters of the spacecraft and momentum exchange devices of the spacecraft using an optimization of a cost function over a receding horizon subject to constraints on a pose of the spacecraft and constraints on inputs to the thrusters, wherein the cost function includes components for controlling the pose of the spacecraft and a momentum stored by the momentum exchange devices; and a force-torque map module for generating a command to control concurrently the thrusters and the momentum exchange devices according to at least a portion of the control inputs, wherein the generated command includes a command to the momentum exchange devices to unload the stored momentum and commands to individual thrusters to generate forces and torques to maintain or change the pose of the spacecraft and to compensate for a torque generated by the momentum exchange devices unloading the stored momentum.

Yet another embodiment discloses a spacecraft having a set of thrusters for changing a pose of the spacecraft; a set of momentum exchange devices for absorbing disturbance torques acting on the spacecraft; and a control system for controlling concurrently operations of the thrusters and the momentum exchange devices, the control system includes at least one processor for executing modules of the control system. The modules include a control input module for determining control inputs for controlling concurrently thrusters of the spacecraft and momentum exchange devices of the spacecraft using an optimization of a cost function over a receding horizon subject to constraints on a pose of the spacecraft and constraints on inputs to the thrusters, wherein the cost function includes components for controlling the pose of the spacecraft and a momentum stored by the momentum exchange devices.

DETAILED DESCRIPTION OF THE PREFERRED EMBODIMENT

Figure 1A:
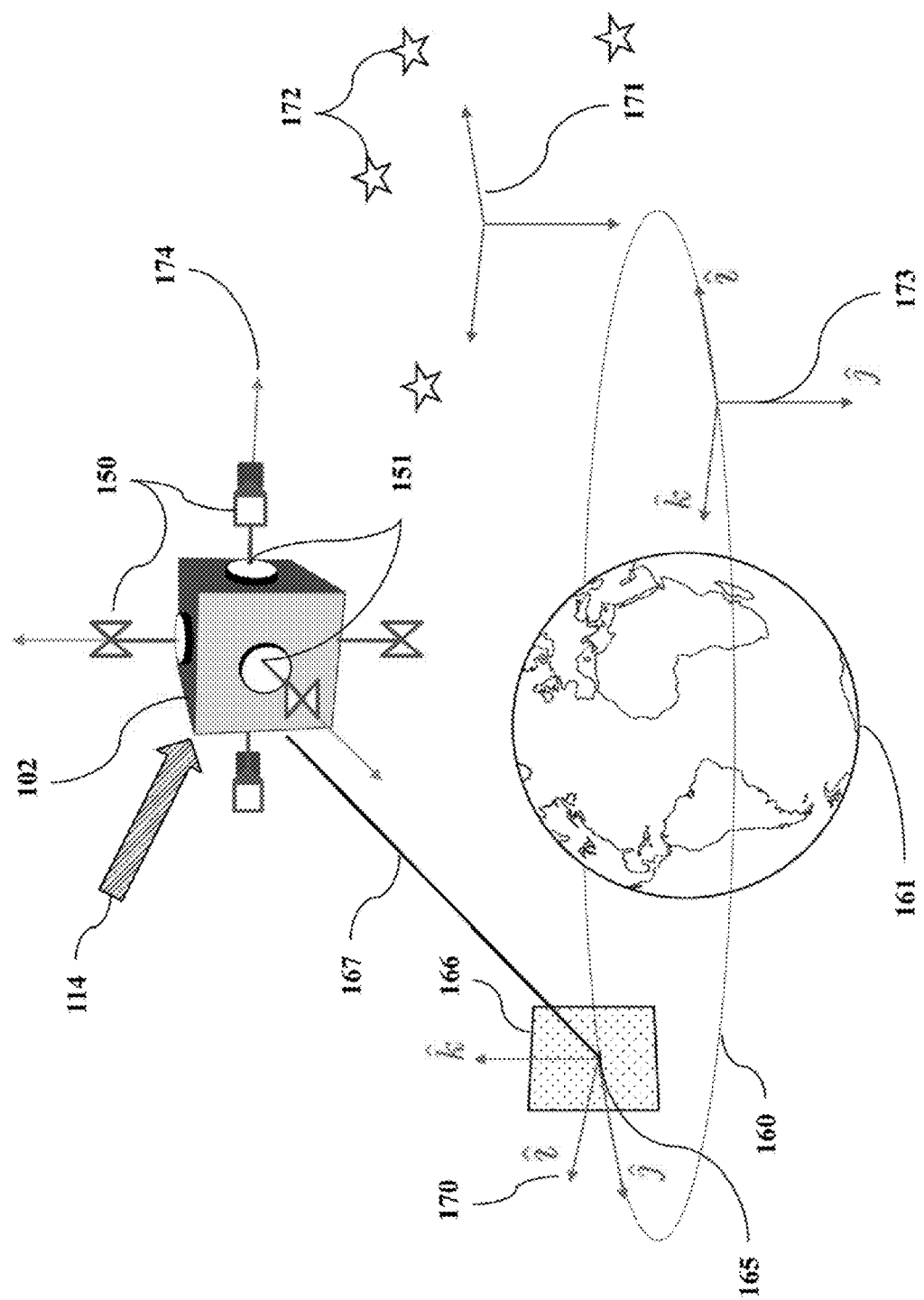
FIGS. 1A, 1B, and 1C are schematics of the problem formulation according to one embodiment of the invention.
Figure 1B:
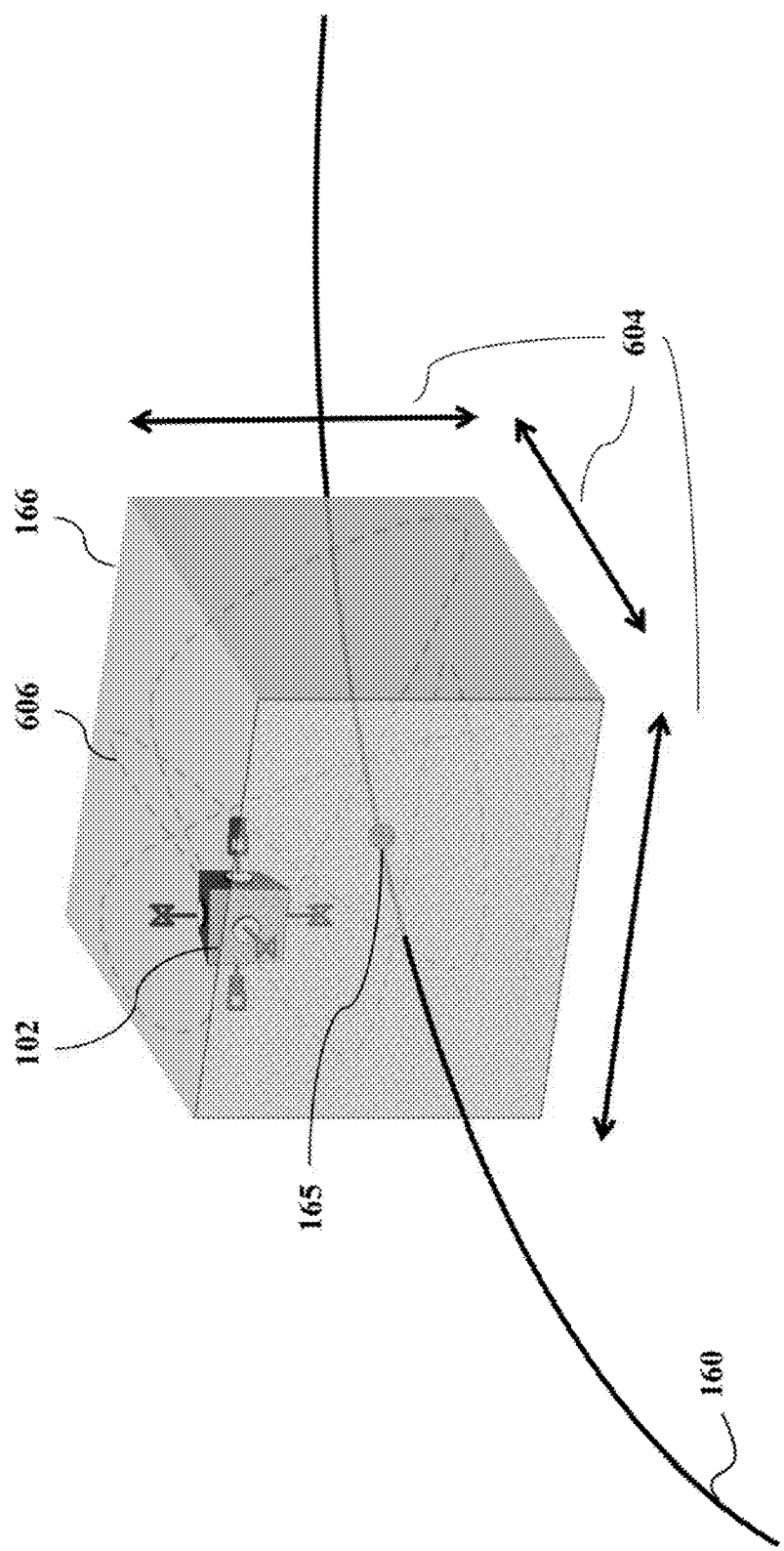

FIGS. 1A and 1B show a spacecraft 102 equipped with a plurality of actuators such as thrusters 150 and momentum exchange devices 151. Examples of the type of actuators include reaction wheels (RWs), and control moment gyroscopes (CMGs). The spacecraft is a vehicle, vessel, or machine designed to fly in outer space whose operation changes quantities such as the position of the spacecraft, its velocities, and its attitude or orientation, in response to commands that are sent to the actuators. When commanded, the actuators impart forces on the spacecraft that increase or decrease the velocity of the spacecraft and thus cause the spacecraft to translate its position, and, when commanded, the actuators also impart torques on the spacecraft, which cause the spacecraft to rotate and thereby change its attitude or orientation. As used herein, the operation of the spacecraft is determined by the operation of the actuators that determine a motion of the spacecraft that changes such quantities.

The spacecraft flies in outer space along an open or closed orbital path 160 around, between, or near one or more gravitational bodies such as the Earth 161, moon, and/or other celestial planets, stars, asteroids, comets. Usually, a desired or target position 165 along the orbital path is given. A reference frame 170 is attached to the desired position, where the origin of the frame, i.e., the all zeros coordinates in that reference frame are the coordinates of the desired position at all times.

The spacecraft is subject to various disturbance forces 114. These disturbance forces are all forces that were not accounted for when determining the orbital path for the spacecraft. These disturbance forces act on the spacecraft to move the spacecraft away from the desired position on the orbital path. These forces can include, but are not limited to, gravitational attraction, radiation pressure, atmospheric drag, non-spherical central bodies, and leaking propellant. Thus, the spacecraft can be at a distance 167 away from the target position.

Because of the disturbance forces, it is not always possible to keep the spacecraft at the desired position along its orbit. As such, it is desired that the spacecraft instead remain within a window 166 with specified dimensions 604 around the desired position. To that end, the spacecraft is controlled to move along any path 606 that is contained within the window. In this example, the window 166 has a rectangular shape, but the shape of the window can vary for different embodiments.

The spacecraft is also often required to maintain a desired orientation. For example, a spacecraft-fixed reference frame 174 is required to be aligned with a desired reference frame such as an inertial reference frame 171 that is fixed relative to distant stars 172, or a reference frame 173 that is always oriented in a manner that points towards the Earth. However, depending on the shape of the spacecraft, different disturbance forces 114 can act non-uniformly on the spacecraft, thereby generating disturbance torques, which cause the spacecraft to rotate away from its desired orientation. In order to compensate for the disturbance torques, momentum exchange devices 151 such as reaction wheels are used to absorb the disturbance torques, thus allowing the spacecraft to maintain its desired orientation.

So that the momentum exchange devices do not saturate, and thereby lose the ability to compensate for disturbance torques, their stored momentum is unloaded, e.g., by reducing spin rates of the reaction wheels. Unloading the momentum exchange devices imparts an undesired torque on the spacecraft. Such an undesired torque is also compensated for by the thrusters.

Figure 1C:
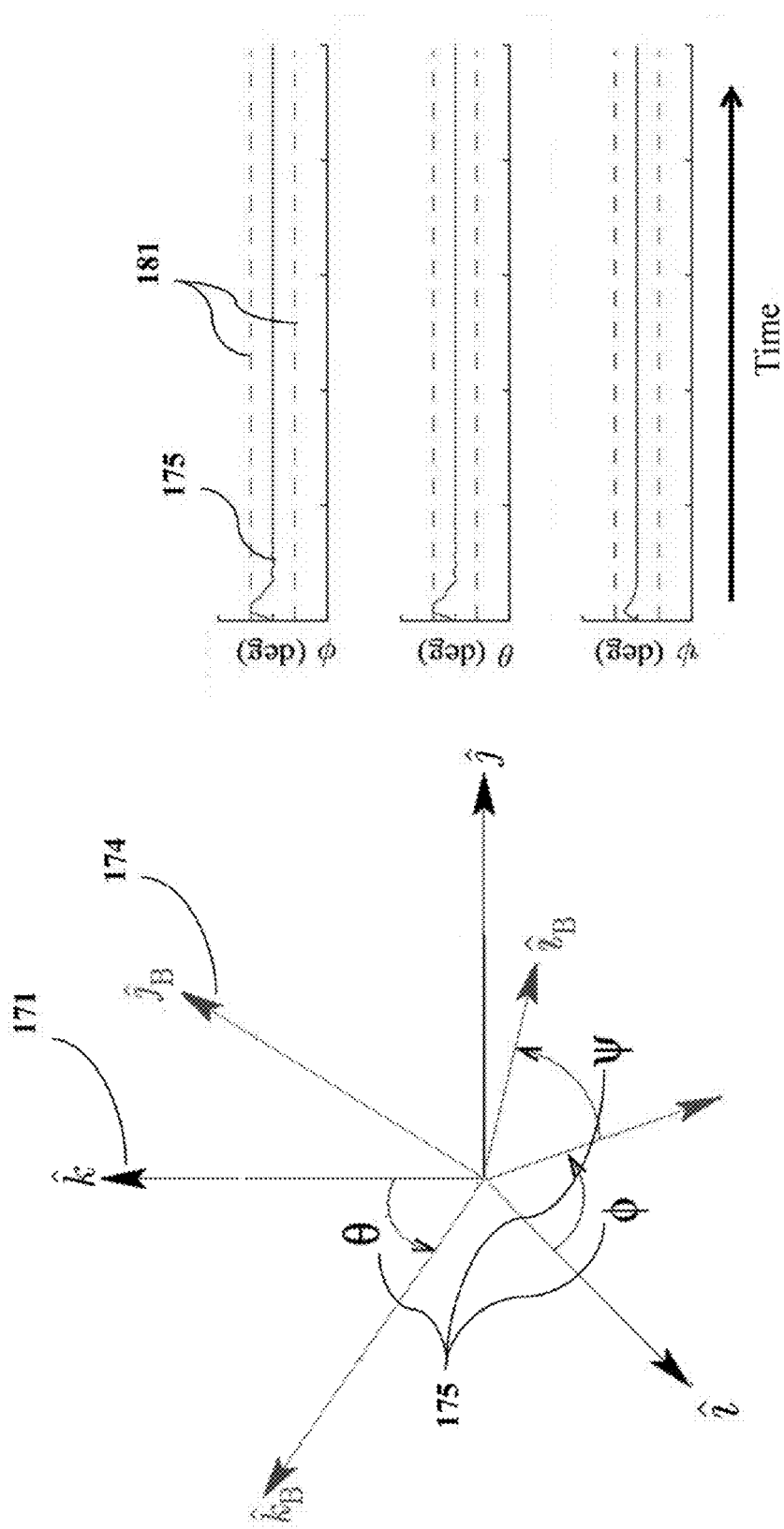

FIG. 1C shows the Euler Angles 175 between the spacecraft-fixed reference frame 174 and the desired reference frame 171. For example, some embodiments control the spacecraft such that the Euler Angles remain within limits 181 during the momentum unloading process.

Figure 2:
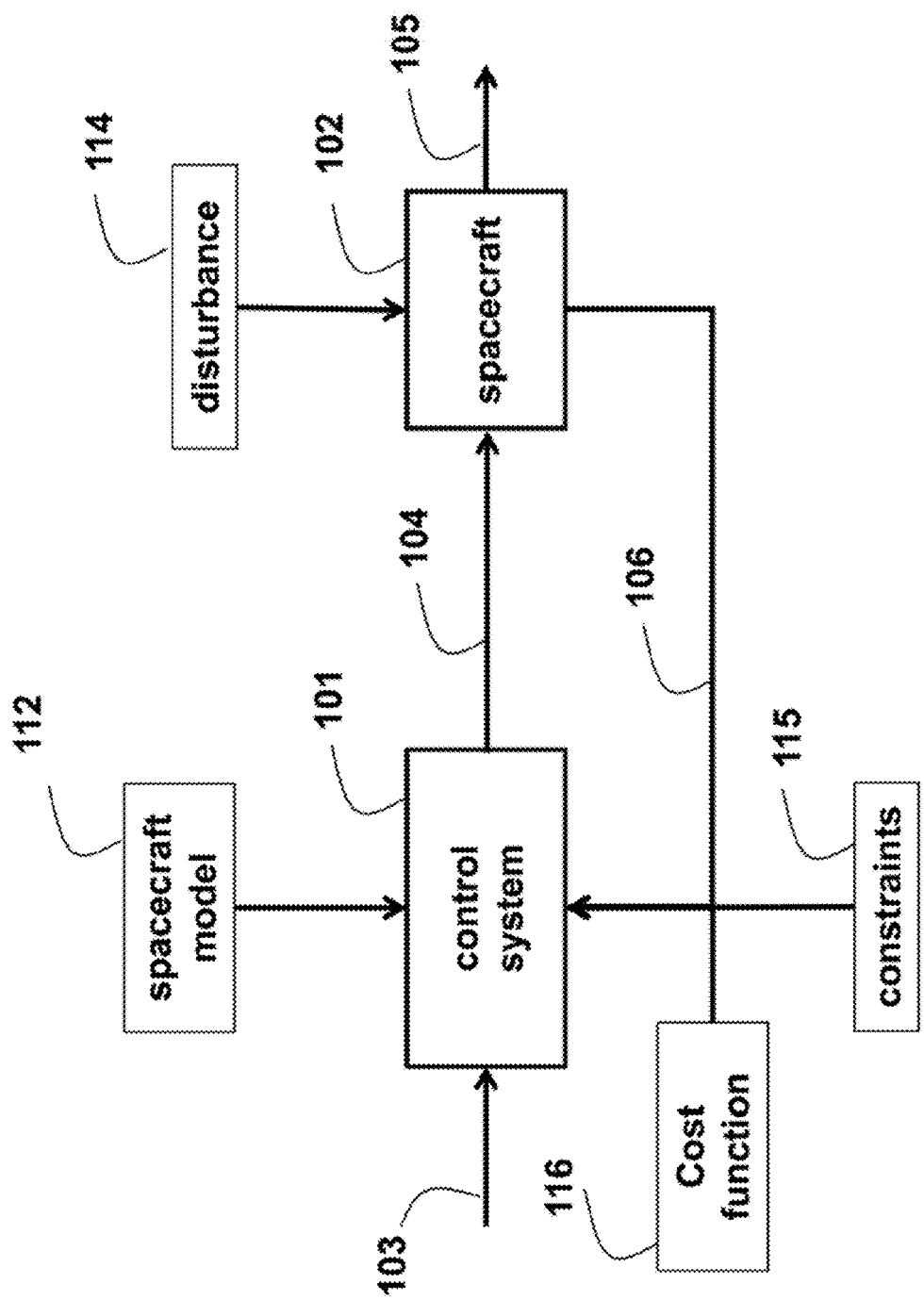
FIG. 2 is a block diagram of a controller for controlling an operation of a spacecraft according to one embodiment of the invention.

FIG. 2 shows a block diagram of a control system 101 for controlling the operation of a spacecraft 102. The control system receives a target operation, e.g., a desired motion 103 for the spacecraft, such as a desired trajectory or a target point for some of the quantities, and controls the spacecraft via control inputs 104. The control inputs can include commands to change parameters of the operation of the spacecraft or can include actual values of the parameters such as voltages, pressures, torques, forces that affect the spacecraft motion resulting in the generation of quantities 105 for the spacecraft. Additionally, disturbance forces and torques 114 affect the spacecraft motion.

It is an objective of some embodiments of the invention to determine the commands 104 to the thrusters 150 and momentum exchange devices 151 so that the spacecraft simultaneously stays within a box 166 and unloads excess stored momentum. This is done by implementing an automatic control system 101 that uses a model of the spacecraft 112. For example, some embodiments determine control inputs for controlling concurrently thrusters of the spacecraft and momentum exchange devices of the spacecraft using an optimization of a cost function 116 over a receding horizon subject to constraints 115 on a pose of the spacecraft and inputs to the thrusters and generate appropriate control input commands 104. The pose of the spacecraft includes one or combination of an absolute or relative position and orientation of the spacecraft. In some embodiments, the cost function includes a component for controlling the pose of the spacecraft and a component for unloading a momentum stored by the momentum exchange devices.

The control system 101 receives information 106 about the spacecraft motion, from sensors, hardware, or software connected directly or remotely to the spacecraft. The information 106 includes a state of the spacecraft. The spacecraft uses the state for the selection of the control inputs 104. The information 106 can include some or all of the motion quantities 105 and can also include additional information about the spacecraft. The quantities 105, the control inputs 104 or a combination thereof, can be requested to remain in some pre-defined ranges according to constraints 115 on the operation of the spacecraft.

The control system 101 achieves the concurrent control using a model predictive control (MPC) over a receding horizon. The MPC is based on an iterative, finite horizon optimization based on a model of the spacecraft, a set of objectives of the motion of the spacecraft, and constraints on the spacecraft propulsion system and motion, and has the ability to anticipate future events and consequently to take appropriate control actions. This is achieved by optimizing the operation of the spacecraft according the set of objectives, over a future finite time-horizon with prediction obtained according to the model of the spacecraft subject to constraints, and only implementing the control over the current timeslot. For example, the constraints can represent physical limitation of the spacecraft, safety limitations on the operation of the spacecraft, and performance limitations on a trajectory of the spacecraft. A control strategy for the spacecraft is admissible when the motion generated by the spacecraft for such a control strategy satisfies all the constraints. For example, at time t, the current state of the spacecraft is sampled and an admissible cost minimizing control strategy is determined for a relatively short time horizon in the future. Specifically, an online or real-time calculation determines a cost-minimizing control strategy until time t+T. After the first step of the control is implemented, the state is measured or estimated again and the calculations are repeated starting from the now current state, yielding a new control and new predicted state trajectory. The prediction horizon shifts forward, and for this reason MPC is also called receding horizon control.

Figure 3:
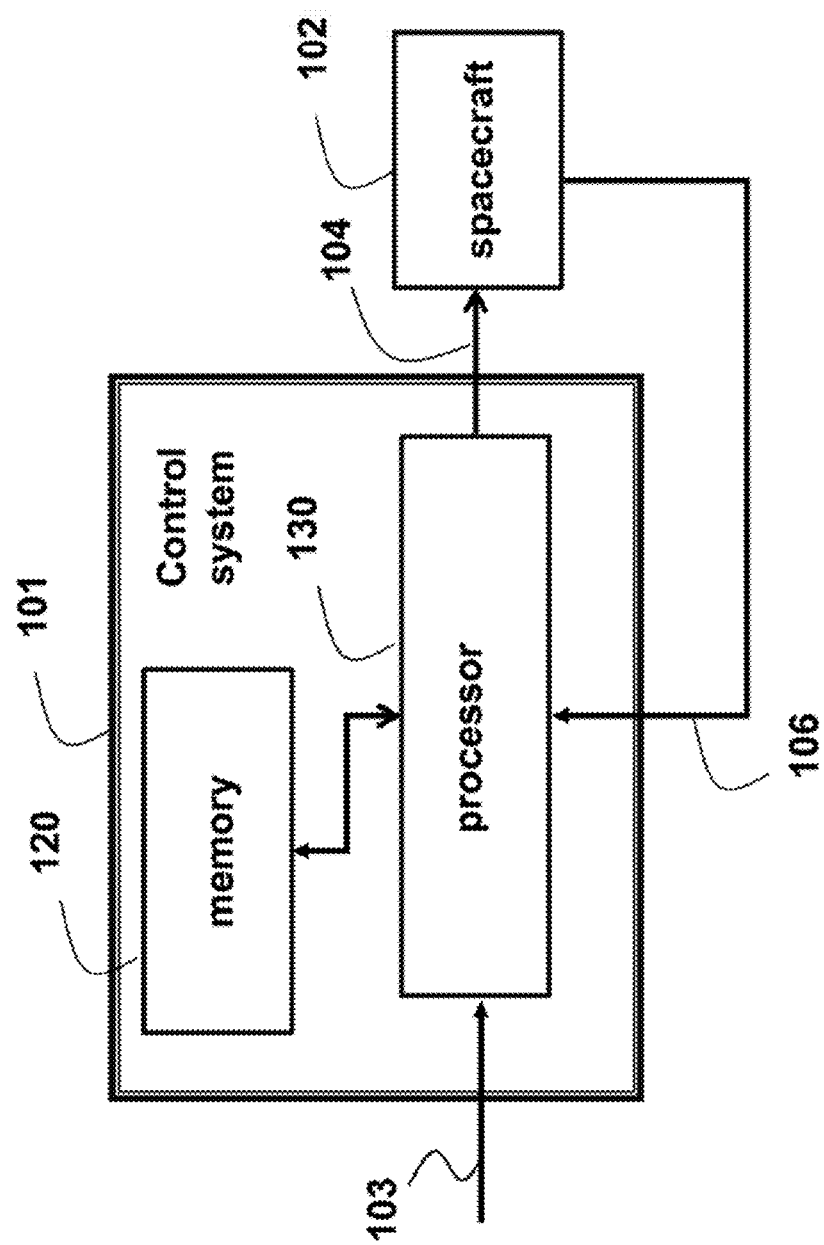
FIG. 3 is a block diagram of a general structure of the controller of FIG. 1A according to one embodiment of the invention.

FIG. 3 shows a general structure of the control system 101 according to one embodiment of the invention. The control system 101 includes at least one processor 130 for executing modules of the controller. The processor 130 is operatively connected to a memory 120 for storing the spacecraft model 112 and the constraints 115. It is an objective of some embodiments of the invention to determine the control inputs 104 using a model of the spacecraft 112 subject to the constraints 115. The memory also can store the cost function 116. In one embodiment, the processor determines and/or updates at least one of the cost function, the constraints and the model during the control.

Figure 4:
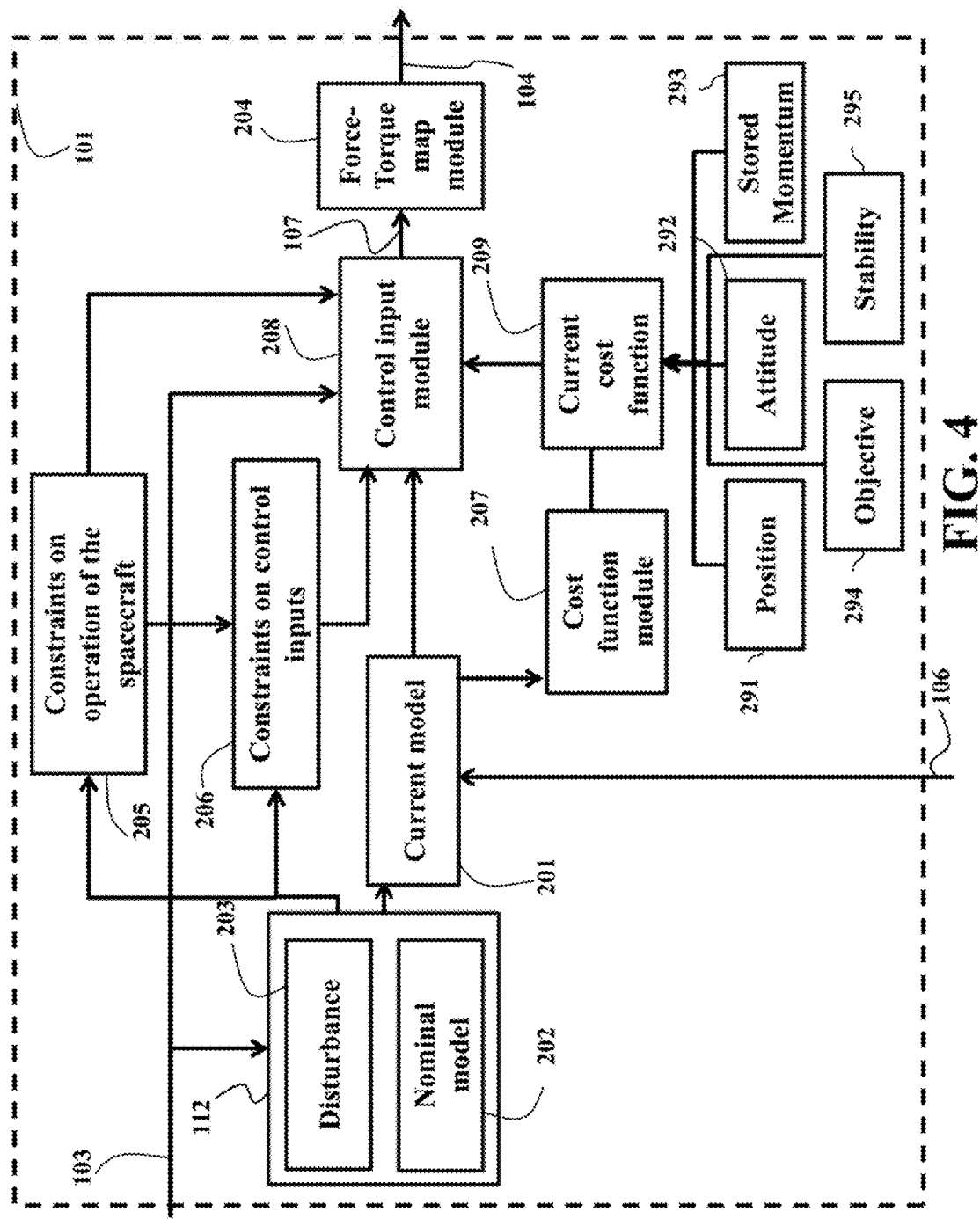
FIG. 4 is a block diagram of various modules of the controller according to one embodiment of the invention.

FIG. 4 shows a block diagram of various modules of the control system 101 according to one embodiment of the invention. In some embodiments, the model of the spacecraft includes a nominal model 202 defining relationships among parameters of the model 112, such as the spacecraft orbital dynamics which governs translational motion of the spacecraft, and the spacecraft attitude dynamics and kinematics which governs attitude motion of the spacecraft. The model 112 also includes a disturbance model 203 defining the disturbance forces 114 acting on the spacecraft. In some embodiments, the disturbance forces are determined as if the spacecraft is located at a predetermined position, e.g., the desired position 165, for different time steps of the control, i.e., regardless of the actual position of the spacecraft. Those embodiments are based on a realization that such an approximation simplifies the computational complexity of the disturbance without a significant reduction of the accuracy. The disturbance module 203 enables the MPC to exploit natural dynamics to compensate for the disturbance forces, so that fuel consumption can be reduced while satisfying motion objectives of the spacecraft.

Some of the spacecraft quantities need to remain in desired ranges defined by constraints 205 on the operation of the spacecraft. For example, such quantities can include a pose of the spacecraft including position constraints derived from the requirement to maintain the spacecraft within the window 166, and orientation constraints derived from the requirement to maintain the Euler Angles 175 remain within limits 181.

Some embodiments of the invention are based on the additional realization that constraints 206 on the control inputs are required in order to satisfy the operational limits of the spacecraft actuators, such as thrust magnitude limits. In some embodiments, the control-input constraints 206 are formulated in a manner so that the single set of thrusters 150 generates both forces for orbital control and torques for attitude control, while respecting the overall thrust magnitude limits. In some embodiments, the constraints 206 are used in combination with at least some constraints 205 for controlling the spacecraft.

In some embodiments, the control inputs 104 are determined based on an optimization of a cost function 209 subject to constraints on the operation of the spacecraft 205 and constraints on the control inputs 206. In some embodiments, the cost function includes a combination of multiple components, including a component 291 for the position of the spacecraft, a component 292 for the attitude of the spacecraft, a component 293 for the stored momentum, a component 294 for an objective of the operation of the spacecraft, and a component 295 for ensuring the stability of the operation of the spacecraft.

For example, the component 291 for the position of the spacecraft penalizes a larger displacement 167 of the spacecraft from the desired position 165, so that the optimization of the cost function 209 results in control inputs that when applied to the spacecraft reduce the displacement 167 in order to help achieve the objective of remaining within the window 166.

The component 292 for the attitude of the spacecraft penalizes a larger magnitude of the Euler Angles 175 of the spacecraft between the spacecraft-fixed reference frame 174 and the desired reference frame, e.g. 171, so that the optimization of the cost function 209 results in control inputs that when applied to the spacecraft reduce the Euler Angles 175 in order to help achieve the objective of maintaining a desired orientation for the spacecraft.

The component 293 for the stored momentum penalizes a larger magnitude of the stored momentum so that the optimization of the cost function 209 results in control inputs that when applied to the spacecraft unload the stored momentum, e.g., the high values of the reaction wheel spin rates are penalized, resulting in an optimization that produces control inputs to reduce the spin rates of the reaction wheels.

The component 294 for the objective of the operation of the spacecraft can, for example, include a penalty on the amount of fuel that the thrusters use in order that the optimization of the cost function 209 results in control inputs that use less fuel, or a penalty on a lower magnitude of the speed at which the spacecraft operates in order that the optimization of the cost function results in control inputs that cause the spacecraft to operate faster, i.e. achieve objectives in a shorter period of time.

The component 295 for the stability is determined such that the optimization of the cost function 209 results in control inputs that ensure the stability of the operation of the spacecraft. In one embodiment, where the desired orbit 160 is circular, the stability component of the cost function penalizes the position of the spacecraft at the end of the MPC horizon by using the solution to the Discrete Algebraic Riccati Equation (DARE). In other embodiments, the desired orbit is not circular. For example the desired orbit is elliptic, or otherwise non-circular and periodic. Then, the stability component penalizes the position of the spacecraft at the end of the MPC horizon by using the solution to the Periodic Differential Riccati Equation (PDRE). Note that the PDRE solution is not constant and thus the penalty for the current cost function 209 is selected to correspond to the PDRE solution at the time instant corresponding to the time at the end of the MPC horizon.

In some embodiments, each of the components 291-294 of the cost function 209 is weighted so that the optimization of the cost function produces control inputs that achieve the various individual component goals with priority corresponding to their relative weight.

For example, in one embodiment, the weights are selected so that the largest weight is given to the component 294 that penalizes the fuel that the thrusters use. As a result, this embodiment generates an operation of the spacecraft that prioritizes using the least amount of fuel possible at the expense of a larger average displacement 167. In a different embodiment, the largest weight is given to the component 291, which penalizes the displacement 167 from the desired position 165. As a result, this embodiment generates an operation of the spacecraft that prioritizes maintaining a small average displacement 167 at the expense of using more fuel. In some embodiments, the component 295 for stability has its weight defined according to the weight that generates a stabilizing control input.

The processor 130 of the control system 101 executes various modules of the control system including a control input module 208 for determining forces, torques, and commands 107 to the onboard momentum exchange devices during a current iteration by optimizing a current cost function 209. The control input module optimizes the current cost function using a current model 201 of the spacecraft subject to constraints on the operation of the spacecraft 205 and constraints on the current control input 206.

In one embodiment, the optimization of the cost function 209 in the control input module 208 is formulated as a quadratic program (QP). Quadratic programs can be solved quickly and efficiently in resource-constrained hardware such as spacecraft, which have limited onboard computational power. In order to take advantage of quadratic programs, linear-quadratic MPC (LQ-MPC) is used.

For example, the control system also includes the current model module 201 for the linearization of the nominal model 202 at the desired target location 165 on the target orbit, and determination of the disturbance forces at the desired target location 165. In some embodiments, the linearization is due to LQ-MPC making use of a linear prediction model. The module 201 determines the current model of the spacecraft for the current time instant and over the entire MPC horizon. The module 201 can also receive the current state of the spacecraft 106 to determine a state of the spacecraft relative to the linearization.

In one embodiment, the control system also includes a force-torque map module 204 for inverting the control-input constraints 206 in order to determine the current control input 104 to apply to the individual thrusters from a total commanded forces and torques for the spacecraft, so that the thrusters altogether impart the desired force and torques 107 to the spacecraft that were generated by the control input module 208. The force-torque map module 204 passes the commands to the onboard momentum exchange devices computed in the control input module 208 without changing them along with the individual thruster commands as the current control input 104.

The control system also includes a cost function module 207 for determining the current cost function 209. For example, the cost function module updates the previous cost function based on change of the target operation of the spacecraft, e.g., a change in the desired motion 103, because different motions can necessitate different cost functions to have the quantities 105 for the spacecraft meet their desired objectives. Also, the cost function module can update the stability component 295 of the cost function if the desired orbit requires an updated weight based on the orbit. Because the steps of the control are performed iteratively, the current model and the current cost function become previous model and previous cost function for subsequent iteration. For example, the previous model, the previous cost function and the previous control input are determined at a previous iteration as the current model, the current cost function and the current control input.

Figure 5:
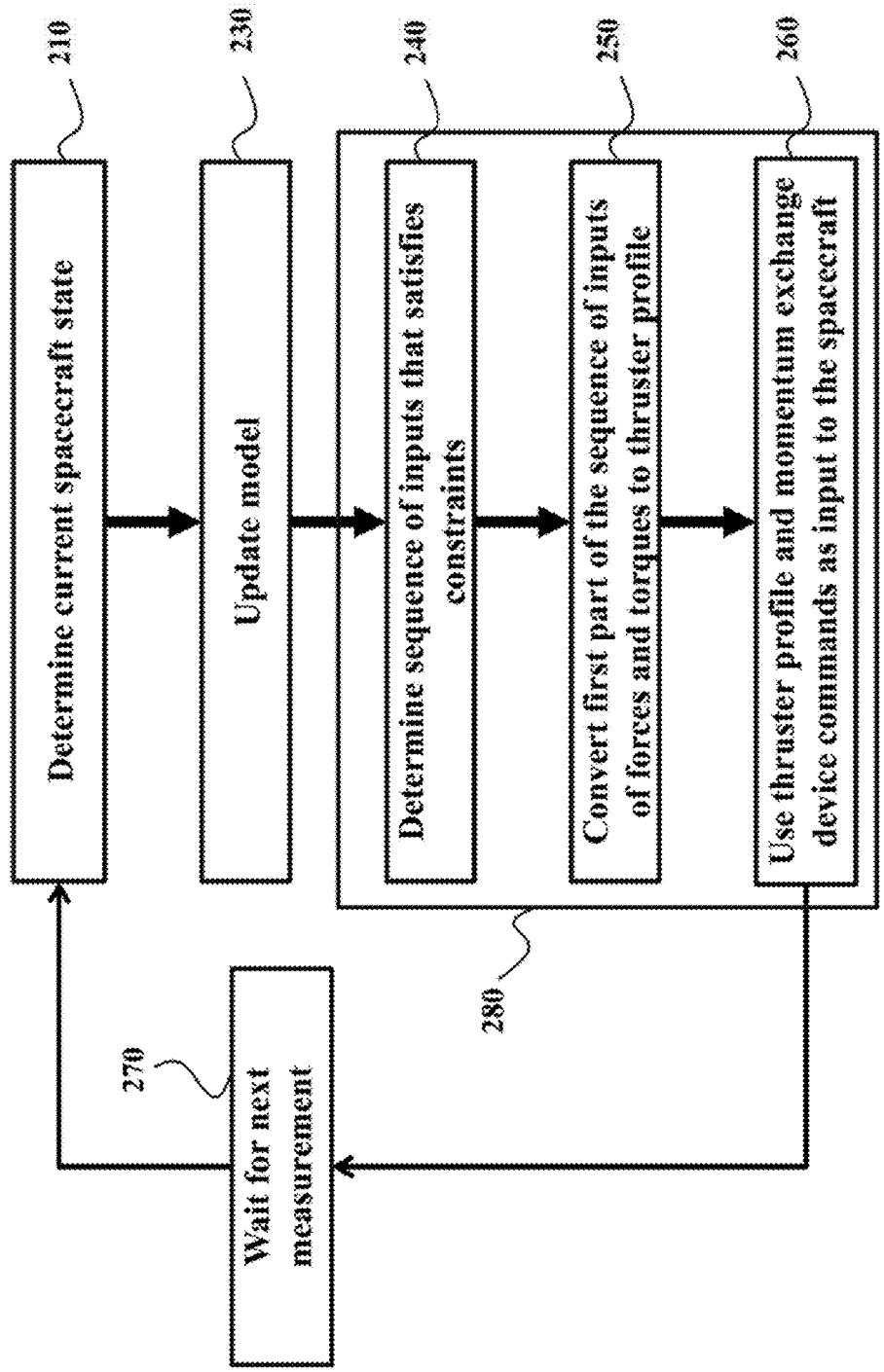
FIG. 5 is a block diagram of a method executed by the modules of the controller according to one embodiment of the invention.

FIG. 5 shows a block diagram of a method executed by the modules of the control system 101. The method controls iteratively the operation of the spacecraft with control inputs determined using the model of the spacecraft based on an optimization of a cost function. The method determines 210 a current state of the spacecraft resulted from the controlling with a previous control input determined for a previous iteration by optimizing a previous cost function using a previous model of the spacecraft. The current spacecraft state can be determined using hardware, software, or communication with the ground, e.g. GPS, relative range measurements, star trackers, horizon sensors.

In one embodiment, prior to determining the current control input, the method updates the model 230. For example, the model update includes linearization of the spacecraft model 112 at the desired target location 165 on the target orbit for the current time instant and over a future prediction horizon. The model update also computes the predicted disturbance forces 230 over the same horizon at the target location and combines it with the dynamics prediction model to form an overall prediction. Finally, in some embodiment, the model update 230 can also update the stability component 295 of the cost function to the correct value for the current time instant and over a future prediction horizon.

Next, the method determines 280 a current control input for controlling the spacecraft at the current iteration using the current model and the current cost function. For example, the method uses the updated current cost function and current spacecraft model to determine 240 a sequence of future inputs of forces, torques, and commands to the onboard momentum exchange devices from current time instant for a fixed amount of time in the future, long at least as to obtain a new spacecraft state measurement, such that the predicted future spacecraft states and inputs satisfy the constraints on the operation of the spacecraft and constraints on the control inputs. The first part of the input sequence, for duration equal to the amount of time needed to obtain a new measurement of the state of the spacecraft, is converted 250 from forces and torques to individual thruster profiles and along with commands to the onboard momentum exchange devices is applied 260 as current control input to the spacecraft. Based on the current state of the spacecraft, current model of the spacecraft, and current control input to the spacecraft, the next state of the spacecraft is determined, and the controller waits 270 until a new state measurement is received.

Equations Used for Computing the Commands to the Thrusters

In one embodiment of the invention, the spacecraft model 112 is determined for a nadir-pointing spacecraft in geostationary Earth orbit (GEO) equipped with six dual-axis electric thrusters 150 and three axisymmetric reaction wheels 151 attached to a rigid bus in an orthogonal and mass balanced configuration. A bus-fixed frame 174 is defined for the spacecraft, and an inertial frame 171 is specified for determining the attitude of the spacecraft. The spacecraft equations of motion are given by $$\ddot{r} = -\mu \frac{r}{|r|^3} + \frac{1}{m}F + a_p, \quad (1)$$

$$J\dot{\omega} = (J\omega + J_\alpha v) \times \omega - J_\alpha \eta + \tau,$$

$$\dot{v} = \eta,$$

$$\dot{R} = R\omega^\times$$

where $r \in R^3$ is the position vector of the spacecraft with respect to the center of the Earth, $F \in R^3$ is the vector of external forces applied by the thrusters, $a_p \in R^3$ is the vector of perturbation accelerations 114, m is the mass of the spacecraft, $\mu$ is Earth's gravitational constant, $J \in R^{3\times3}$ is the moment of inertia of the spacecraft bus and reaction wheel array, $J_\alpha \in R^{3\times3}$ is the moment of inertia of the reaction wheel array, $\omega \in R^3$ is the angular velocity of the bus frame with respect to the inertial frame, $v \in R^3$ is the angular velocity of the reaction wheel array, $\tau \in R^3$ is the torque applied by the thrusters, $\omega \times$ is the cross-product matrix of $\omega$, and $R \in R^{3\times3}$ is the rotation dyadic that transforms the inertial frame 171 into the bus frame 174 resolved in the bus frame 174.

In other embodiments, the equations in (1) are substituted for equations that govern a spacecraft in other orbits and with other momentum exchange devices other than reaction wheels.

In one embodiment, the model (1) is linearized to form a current prediction model 201. For small maneuvers around a nominal circular orbit, linearized equations approximate spacecraft relative motion as $$\delta\ddot{x} - 3n^2\delta x - 2n\dot{\delta y} = \frac{F_x}{m} + a_{p,x}, \quad (2)$$

$$\delta\ddot{y} + 2n\dot{\delta x} = \frac{F_y}{m} + a_{p,y},$$

$$\delta\ddot{z} + n^2\delta z = \frac{F_z}{m} + a_{p,z}$$

where $\delta x$, $\delta y$ and $\delta z$ are the components of the position vector of the spacecraft relative to the nominal location 165, Fx, Fy, Fz are the thrust force vector components, $a_{p,x}$, $a_{p,y}$, $a_{p,z}$ are the perturbation acceleration vector components, and $n=\sqrt{\mu/R_0^3}$ is the mean motion of the nominal orbit.

In one embodiment, the attitude-error rotation matrix $\bar{R}=R^T R_d$ is parameterized using the set of 3-2-1 Euler angles ($\psi$, $\theta$, $\phi$) as $\bar{R}=C_1(\phi)C_2(\theta)C_3(\psi)$, where $R_d$ is the desired attitude trajectory, and $C_1$, $C_2$, and $C_3$ are elementary rotations about the x, y, and z-axes by $\psi$, $\theta$, and $\phi$, respectively. The linearization of the attitude dynamics and kinematics about an equilibrium y-axis (principal axis) spin with an angular rate corresponding to the mean motion n of the orbit is $$J_1\dot{\delta\omega}_1 = -(J_2-J_3+\alpha_2-\alpha_3)n\delta\omega_3 + n\alpha_3\delta v_3 - \alpha_1\eta_1 + \tau_1,$$

$$J_2\dot{\delta\omega}_2 = -\alpha_2\eta_2 + \tau_2,$$

$$J_3\dot{\delta\omega}_3 = -(J_1-J_2+\alpha_1-\alpha_2)n\delta\omega_1 - n\alpha_1\delta v_1 - \alpha_3\eta_3 + \tau_3,$$

$$\dot{\delta v}_1 = \eta_1, \dot{\delta\phi} = \delta\omega_1 + n\delta\psi,$$

$$\dot{\delta v}_2 = \eta_2, \dot{\delta\theta} = \delta\omega_2,$$

$$\dot{\delta v}_3 = \eta_3, \dot{\delta\psi} = \delta\omega_3 - n\delta\phi, \quad (3)$$

where $\delta\omega_1$, $\delta\omega_2$, $\delta\omega_3$, $\delta\phi$, $\delta\theta$, $\delta\psi$, and $\delta v_1$, $\delta v_2$, $\delta v_3$ are the relative angular velocity components of the spacecraft, relative Euler angles of the spacecraft, and relative angular velocity components of the reaction wheel array, that is, they are quantities that represent the error from the desired spacecraft angular velocity components, desired Euler angles, and desired reaction wheel array angular velocity components.

For embodiments in which a spacecraft is in GEO, the main perturbation accelerations are due to solar and lunar gravitational attraction, solar radiation pressure, and the anisotropic geopotential, that is, Earth's non-spherical gravitational field. Analytic expressions for these perturbation forces per unit mass, i.e., the disturbance accelerations, are given, respectively, by $$\vec{a}_{sun} = \mu_{sun}\left(\frac{\vec{r}_{sun/sc}}{r_{sun/sc}^3} - \frac{\vec{r}_{sun/earth}}{r_{sun/earth}^3}\right), \quad (4)$$

$$\vec{a}_{moon} = \mu_{moon}\left(\frac{\vec{r}_{moon/sc}}{r_{moon/sc}^3} - \frac{\vec{r}_{moon/earth}}{r_{moon/earth}^3}\right),$$

$$\vec{a}_{srp} = C_{srp}\frac{S(1+c_{refl})}{2m}\frac{\vec{r}_{sc/sun}}{r_{sc/sun}},$$

$$\vec{a}_{J_2} = \frac{3\mu J_2 \rho_E^2}{2r^5}\left(\left(5\frac{(\vec{r}\cdot\hat{k}_E)^2}{r^2} - 1\right)\vec{r} - 2(\vec{r}\cdot\hat{k}_E)\hat{k}_E\right),$$

where $\vec{\phantom{r}}$ denotes a coordinate-free (unresolved) vector, $\mu_{sun}$ and $\mu_{moon}$ are the gravitational constants of the sun and moon, $C_{srp}$ is the solar radiation pressure constant, S is the solar-facing surface area, $c_{refl}$ is the surface reflectance, $\rho_E$ is Earth's equatorial radius, $\hat{k}_E$ is the z-axis unit vector of the Earth-centered inertial frame, and $J_2$ is the dominant coefficient in the considered geopotential perturbation model, where additional higher order terms are ignored. The sum of the individual disturbance accelerations in (4) yields the total disturbance acceleration considered in (1).

In some embodiments, a state-space model is given by $$\dot{x}(t)=A_c x(t)+B_c u(t), \quad (5)$$

where $$x=[\delta x \delta y \delta z \delta \dot{x} \delta \dot{y} \delta \dot{z} \delta \phi \delta \theta \delta \psi \delta \omega_1 \delta \omega_2 \delta \omega_3 \delta v_1 \delta v_2 \delta v_3]^T, \quad (6)$$

$$u=[F_x F_y F_z \eta_1 \eta_2 \eta_3 \tau_1 \tau_2 \tau_3]^T. \quad (7)$$

In order to be used as a prediction model in the MPC policy, (5) is discretized with a sampling period of $\Delta T$ sec which yields $$x_{k+1}=Ax_k+Bu_k, \quad (8)$$

where $x_k$ is the state at time step $k \in Z^+$, $u_k$ is the control vector at the time step $k \in Z^+$, and $A=\exp(A_c \Delta T)$, $B=\int_0^{\Delta T} \exp(A_c(\Delta T-\tau))d\tau B_c$ are the discretized matrices obtained based on the continuous-time system realization $(A_c, B_c)$ in (5).

Estimation of the Disturbances Acting on the Spacecraft

In some embodiments, the model (8) is augmented with a prediction 203 model of the disturbance accelerations (4), obtaining $$x_{k+1}=Ax_k+Bu_k+O_{H/E}a_{p,k}, \quad (9)$$

where $a_{p,k}$ is the total disturbance acceleration predicted at time step k based on propagation of the desired position 165, and $O_{H/E}$ is the rotation matrix that transforms the components of $a_{p,k}$ from the inertial frame 171 into the components of the same acceleration in the desired reference frame 170.

The desired position 165 for disturbance-acceleration prediction is used in (9) due to the nonlinearity of the analytical expressions in (4).

Figure 6:
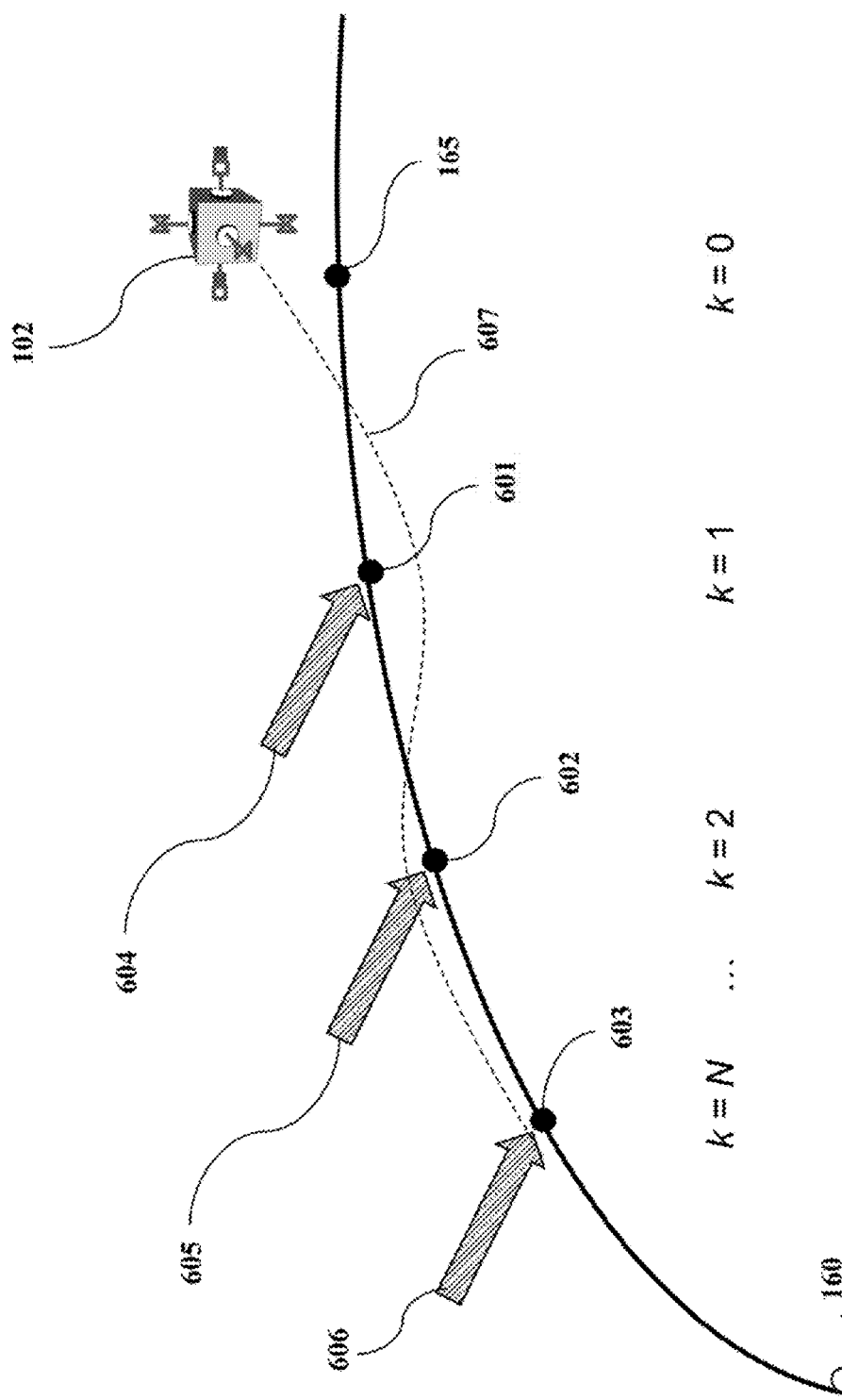
FIG. 6 is a schematic of the disturbance prediction problem according to one embodiment of the invention.

FIG. 6 shows the spacecraft 102 displaced from its desired position 165 at time step k=0. Because the desired positions 601, 602, and 603 on the nominal orbit 160 at time steps k=1, k=2, ..., k=N are known in advance, $a_{p,k}$ can be predicted based on the analytical expressions (4) at time steps k=1, k=2, ..., k=N from the disturbance forces 604, 605, and 606. As the spacecraft position is to be constrained in a tight window 166, the difference in the disturbance accelerations at the desired positions 601, 602, and 603 and at the true satellite position 907, which is unknown in advance, is negligible. Accordingly, some embodiments determine the disturbance forces as if the spacecraft is located at the target position for the entire period of the receding horizon.

Constraints on Inputs to Thrusters

In some embodiments, constraints 205 on the operation of the spacecraft are imposed, at least in part, by $\delta y$ and $\delta z$, corresponding to a station keeping window 166 using the relations $$|\delta y| \le r_0 \tan(\lambda_{1,max}), \quad (10a)$$

$$|\delta z| \le r_0 \tan(\lambda_{2,max}), \quad (10b)$$

where $\lambda_{1,max}$ is the maximum tolerable longitude error, and $\lambda_{2,max}$ is the maximum tolerable latitude error.

In some embodiments of the invention, the spacecraft is equipped with six dual-axis thrusters. Define $T=[T_1\ T_2\ T_3\ T_4\ T_5\ T_6]$, where $T_i$ is the force exerted by each dual-axis thruster. Constraints on the individual thruster magnitudes, i.e., $$\|T\|_\infty \le T_{max}, \quad (11)$$

$$\begin{bmatrix} O_{L/H} & 0 \\ 0 & I \end{bmatrix} \begin{bmatrix} F \\ \tau \end{bmatrix} = \begin{bmatrix} \Gamma & \Gamma \\ L & -L \end{bmatrix} T, \quad (12)$$

are related to constraints on the control input forces F and torques $\tau$ via the force-torque map 204. Combining (11) and (12) yields the constraint on control inputs 206 for forces and torques which effectively couples (2) with (3), i.e., the thrusters generate both forces for orbital control and torques for attitude control $$\left\| \begin{bmatrix} \Gamma & \Gamma \\ L & -L \end{bmatrix}^{-1} \begin{bmatrix} O_{L/H} & 0 \\ 0 & I \end{bmatrix} \begin{bmatrix} F \\ \tau \end{bmatrix} \right\|_\infty \le T_{max}. \quad (13)$$

Figure 7:
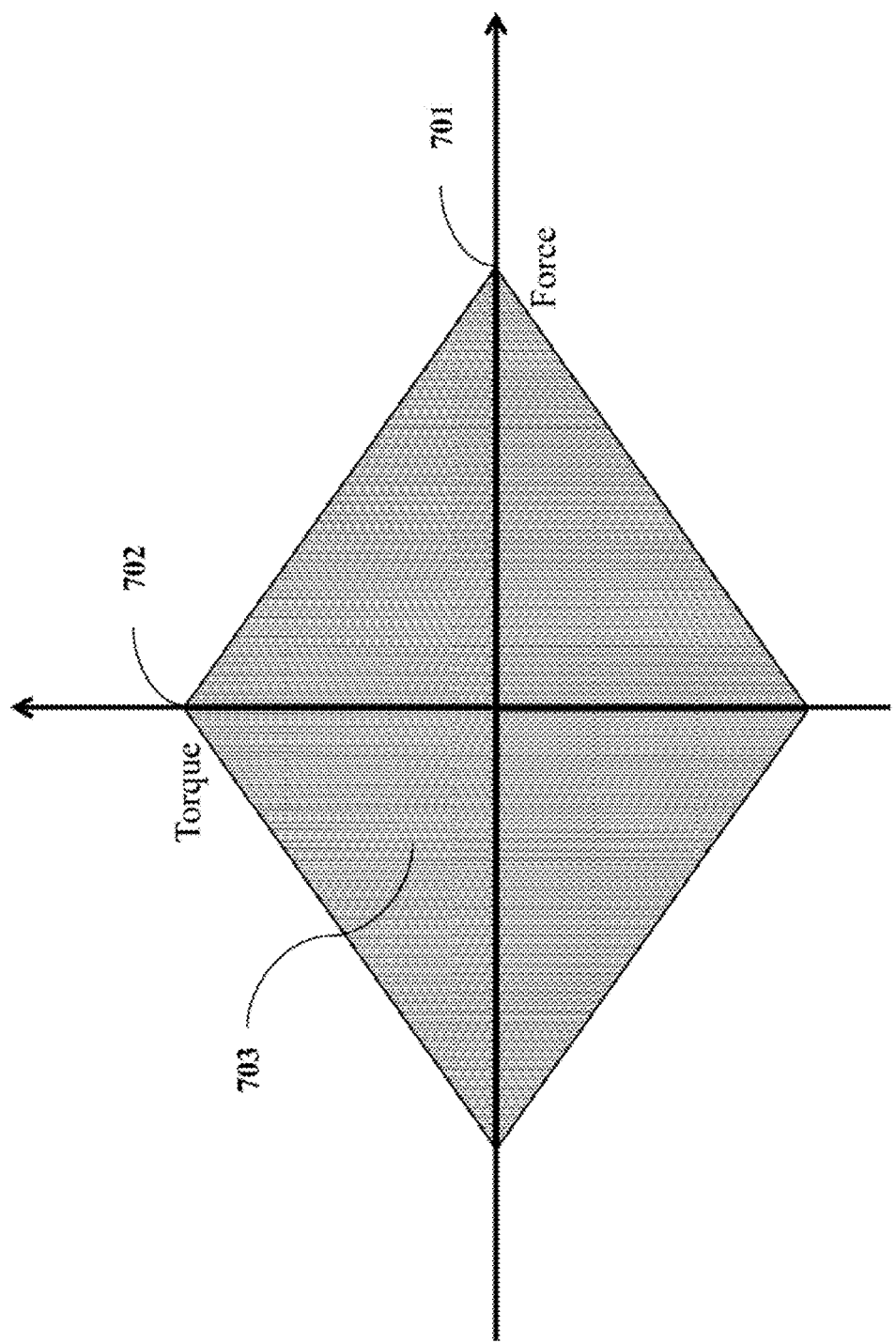
FIG. 7 is a schematic of an exemplar region of realizable force and torque values for a pair of thrusters according to one embodiment of the invention.

FIG. 7 shows an example of the region 703 of realizable force and torque values for a pair of thrusters, where the maximum force 701 the thruster pair can produce trades off with the maximum torque 702 the pair can produce. Constraint (13) ensures that the control system 101 generates feasible commands 104 to the spacecraft thrusters so that the dual objectives of the spacecraft staying within a box 166 and unloading excess stored momentum can be simultaneously realized.

In some embodiments, the relative Euler angles ($\delta\phi$, $\delta\theta$, $\delta\psi$) are constrained to be within a small tolerance, $$|\delta\phi| \le \delta\phi_{max}, |\delta\theta| \le \delta\theta_{max}, |\delta\psi| \le \delta\psi_{max}, \quad (14)$$

in order maintain the spacecraft orientation, even while unloading excess stored momentum.

Cost Function Objectives

In some embodiments, the current cost function 209 is composed of costs associated with various objectives, e.g. an objective $J_1$ that quantifies displacement from the nominal orbital position, an objective $J_2$ that quantifies the error in the Euler angles and penalizes the spacecraft angular velocity components, an objective $J_3$ that penalizes usage of the thrusters to generate forces and torques, and an objective $J_4$ that penalizes the reaction wheel momentum. In some embodiments, these costs $J_1$-$J_4$ are given by $$J_1=(\delta x)^2+(\delta y)^2+(\delta z)^2$$

$$J_2=(\delta\phi)^2+(\delta\theta)^2+(\delta\psi)^2+(\delta\omega_1)^2+(\delta\omega_2)^2+(\delta\omega_3)^2$$

$$J_3=(F_x)^2+(F_y)^2+(F_z)^2+(\tau_1)^2+(\tau_2)^2+(\tau_3)^2$$

$$J_4=(\eta_1)^2+(\eta_2)^2+(\eta_3)^2$$

Each objective $J_1$-$J_4$ is multiplied by a weight $w_i$ and combined into a total cost function $J_{tot}$, $$J_{tot}=\Sigma_{i=1,\ldots,4} w_i J_i. \quad (18)$$

The weight $w_i$ assigned to each objective determines its relative importance. The larger the weight assigned to given objective, the more that objective takes precedence when the cost function is optimized.

Based on (6) and (7), $J_{tot}$ can be written for the state-space formulation as $$J_{tot}=x^T Q x + u^T R u, \quad (19)$$

where Q and R are symmetric positive definite weighting matrices that encode the weights $w_i$ assigned to each objective and may further modify or add additional weights such as cross-weights that are not evident from the component formulation (18).

Stability Objective of the Cost Function

In some embodiments, where the desired orbit is not circular, for example elliptic, or otherwise non-circular and periodic, then the model 201 of the spacecraft motion about that orbit may be linear and time-varying. In such embodiments, the component 295 of the cost function 209 for the stability is determined based on the solution to the Periodic Difference Riccati Equation (PDRE)

$$P_k = Q_k + A_k^T P_{k+1} A_k - A_k^T P_{k+1} B_k (R_k + B_k^T P_{k+1} B_k)^{-1} B_k^T P_{k+1} A_k \qquad (15)$$

where $A_k$, $B_k$ are the matrices of the model 201 at time step k, and $P_k$, $Q_k$, and $R_k$, are symmetric positive definite weighting matrices. The matrices $Q_k$ and $R_k$ are taken to be the same as the weighting matrices in (19).

For embodiments where the linearization is time-invariant, such as motion around a nominal circular orbit, e.g. GEO, the component 295 for the stability is determined based on the solution to the Discrete Algebraic Riccati Equation (DARE)

$$P = Q + A^T PA - A^T PB(R + B^T PB)^{-1} B^T PA \qquad (16)$$

where A, B are the matrices of the model in (8), and P, Q, and R, are symmetric positive definite weighting matrices. As above, the matrices Q and R are taken to be the same as the weighting matrices in (19).

Control Input Computation

In some embodiments, the control input module 208 takes the form of a finite horizon numerical optimization problem, $$\min_U x_N^T P_N x_N + \sum_{k=1}^{N-1} x_k^T Q_k x_k + u_k^T R_k u_k, \qquad (17)$$

s.t. $x_{k+1} = A_k x_k + B_k u_k + O_{H/E,k} a_{p,k}$, $x_0 = x(t)$, $T_{min} \leq Du_k \leq T_{max}$, $\delta y_{min} \leq \delta y \leq \delta y_{max}$, $\delta z_{min} \leq \delta z \leq \delta z_{max}$, $\delta \phi_{min} \leq \delta \phi_k \leq \delta \phi_{max}$, $\delta \theta_{min} \leq \delta \theta_k \leq \delta \theta_{max}$, $\delta \psi_{min} \leq \delta \psi_k \leq \delta \psi_{max}$, which is formed from the current cost function 209, the current linearized spacecraft model 201 that predicts the evolution of the state over the horizon using (9), and the spacecraft constraints 206 using (10), (13), and (14), where $P_N$, $Q_k$, $R_k$ are the matrices given in (15), D is the matrix that enforces the concurrently available forces and torques as in (13), and x(t) is the state at the current time step. The problem (17) is solved using a numerical solver, which finds the input sequence $U=[u_1 \ldots u_N]^T$ that minimizes the current cost function subject to the problem constraints.

The first input $u_1$ in the input sequence is considered as the output 107 of the input computation 208. The input $u_1$ is passed to the force-torque map module 204, which constructs the commands 104 to the thrusters by inverting (12), resulting in feasible values that can be concurrently achieved by the spacecraft thrusters due to the input satisfying (13).

At the next time step, t+1 the model and cost function are updated, the state is updated, and the numerical optimization problem is solved again.

If the orbit is such that the spacecraft model 201 is time-invariant, then $A_1 = A_2 = \ldots = A$, $B_1 = B_2 = \ldots = B$, and $P_N$, $Q_k$, and $R_k$ in (17) are given by the matrices P, Q, and R in (16). The inclusion of $P_N$ or P in the cost function of (17) ensures local stability of the target position, as near the origin, where constraints are inactive, and in the absence of disturbance prediction, the solution of (17) is equivalent to that of either a Periodic-LQR or LQR controller.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools.

Also, the embodiments of the invention may be embodied as a method, of which an example has been provided. The steps performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for controlling an operation of a spacecraft according to a model of the spacecraft, comprising:
    determining control inputs for controlling concurrently thrusters of the spacecraft and momentum exchange devices of the spacecraft using an optimization of a cost function over a receding horizon subject to constraints on a pose of the spacecraft and constraints on inputs to the thrusters, wherein the cost function includes components for controlling the pose of the spacecraft and a momentum stored by the momentum exchange devices, wherein the cost function is determined as a combination of multiple components including a component for a position of the spacecraft penalizing a displacement of the spacecraft from a desired position, a component for an attitude of the spacecraft penalizing larger values of Euler Angles of the spacecraft, a component for the stored momentum penalizing larger value of a magnitude of the stored momentum, a component for an objective of the operation of the spacecraft, and a component for ensuring a stability of the operation of the spacecraft; and generating a command to control concurrently the thrusters and the momentum exchange devices according to at least a portion of the control inputs, wherein steps of the method are performed by a processor of the spacecraft.

2. The method of claim 1, wherein the optimization is based on the model of the spacecraft including a nominal model defining relationships among parameters of the model and a disturbance model defining disturbance forces acting on the spacecraft.

3. The method of claim 2, further comprising:
performing a linearization of the nominal model as if the spacecraft is located at a target position for the entire period of the receding horizon; and
determining the disturbance forces as if the spacecraft is located at the target position for the entire period of the receding horizon.

4. The method of claim 1, wherein the constraints on the pose of the spacecraft include a position constraint maintaining a position of the spacecraft within a predetermined window and an orientation constraint maintaining Euler Angles of the spacecraft within a predetermined limit.

5. The method of claim 1, wherein the constraints on the inputs to the thrusters guarantees an ability of the thrusters to jointly generate a force for controlling the pose of the spacecraft and a torque for unloading the momentum stored by the momentum exchange devices of the spacecraft.

6. The method of claim 1, wherein the generated command includes a command to the momentum exchange devices to unload the stored momentum and a command to the thrusters to generate a force and a first torque to maintain or change the pose of the spacecraft and compensate for a second torque generated by the momentum exchange devices unloading the stored momentum.

7. The method of claim 6, further comprising:
generating first a total torques and forces command that are requested from the propulsion system of the spacecraft and then inverting the total torques and forces command to generate control inputs to each individual thruster.

8. The method of claim 1, further comprising:
weighting each of the components of the cost function, such that the optimization of the cost function produces control inputs that achieve goals of each individual component with priority corresponding to their relative weight.

9. The method of claim 8, wherein the control inputs are determined iteratively, and wherein at least one iteration comprises:
updating one or combination of the components of the cost function and weights of the components of the cost function based on a change of a desired operation of the spacecraft.

10. A control system for controlling an operation of a spacecraft according to a model of the spacecraft, comprising at least one processor for executing modules of the control system, the modules comprising:
a control input module for determining control inputs for controlling concurrently thrusters of the spacecraft and momentum exchange devices of the spacecraft using an optimization of a cost function over a receding horizon subject to constraints on a pose of the spacecraft and constraints on inputs to the thrusters, wherein the cost function includes components for controlling the pose of the spacecraft and a momentum stored by the momentum exchange devices;

a cost function module for determining the cost function as a combination of multiple components including a component for a position of the spacecraft penalizing a displacement of the spacecraft from a desired position, a component for an attitude of the spacecraft penalizing an increase of Euler Angles of the spacecraft, a component for the stored momentum penalizing an increase of a magnitude of the stored momentum, a component for an objective of the operation of the spacecraft, and a component for ensuring a stability of the operation of the spacecraft, and for weighting each of the components of the cost function, such that the optimization of the cost function produces control inputs that achieve goals of each individual component with priority corresponding to their relative weight; and a force-torque map module for generating a command to control concurrently the thrusters and the momentum exchange devices according to at least a portion of the control inputs, wherein the generated command includes a command to the momentum exchange devices to unload the stored momentum and commands to individual thrusters to generate forces and torques to maintain or change the pose of the spacecraft and to compensate for a torque generated by the momentum exchange devices unloading the stored momentum.

11. The control system of claim 10, wherein the optimization is based on the model of the spacecraft including a nominal model defining relationships among parameters of the model and a disturbance model defining disturbance forces acting on the spacecraft, further comprising:
a current model module for linearizing the nominal model and determining the disturbance forces as if the spacecraft is located at a target position for the entire period of the receding horizon.

12. The control system of claim 10, wherein the constraints on the pose of the spacecraft include a position constraint maintaining a position of the spacecraft within a predetermined window and an orientation constraint maintaining Euler Angles of the spacecraft within a predetermined limit, and wherein the constraints on the inputs to the thrusters guarantees an ability of the thrusters to jointly generate a force for controlling the pose of the spacecraft and a torque for unloading the momentum stored by the momentum exchange devices of the spacecraft.

13. The control system of claim 10, wherein the control inputs are determined iteratively, and wherein for at least one iteration, the cost function module updates one or combination of the components of the cost function and weights of the components of the cost function based on a change of a target operation of the spacecraft.

14. A spacecraft comprising:
a set of thrusters for changing a pose of the spacecraft;
a set of momentum exchange devices for absorbing disturbance torques acting on the spacecraft; and
the control system of claim 10 for controlling the thrusters and the momentum exchange devices.

15. A spacecraft comprising:
a set of thrusters for changing a pose of the spacecraft;
a set of momentum exchange devices for absorbing disturbance torques acting on the spacecraft; and a control system for controlling concurrently operations of the thrusters and the momentum exchange devices, the control system includes at least one processor for executing modules of the control system, the modules comprising:
- a control input module for determining control inputs for controlling concurrently thrusters of the spacecraft and momentum exchange devices of the spacecraft using an optimization of a cost function over a receding horizon subject to constraints on a pose of the spacecraft and constraints on inputs to the thrusters, wherein the cost function includes components for controlling the pose of the spacecraft and a momentum stored by the momentum exchange devices;
- a force-torque map module for generating a command to control concurrently the thrusters and the momentum exchange devices according to at least a portion of the control inputs, wherein the generated command includes a command to the momentum exchange devices to unload the stored momentum and commands to individual thrusters to generate forces and torques to maintain or change the pose of the spacecraft and to compensate for a torque generated by the momentum exchange devices unloading the stored momentum;
- a current model module for determining a model of the spacecraft used by the optimization by linearizing a nominal model defining relationships among parameters of the model of the spacecraft and including disturbance forces in the model determined as if the spacecraft is located at a target position for the entire period of the receding horizon; and
- a cost function module for determining the cost function as a combination of multiple components including a component for a position of the spacecraft penalizing a displacement of the spacecraft from a desired position, a component for an attitude of the spacecraft penalizing an increase of Euler Angles of the spacecraft, a component for the stored momentum penalizing an increase of a magnitude of the stored momentum, a component for an objective of the operation of the spacecraft, and a component for ensuring a stability of the operation of the spacecraft, and for weighting each of the components of the cost function, such that the optimization of the cost function produces control inputs that achieve goals of each individual component with priority corresponding to their relative weight.

16. The spacecraft of claim 15, wherein the control inputs are determined iteratively, and wherein for at least one iteration, the cost function module updates one or combination of the components of the cost function and weights of the components of the cost function based on a change of a target operation of the spacecraft.

* * * * *